(12) United States Patent
Kitaguchi

(10) Patent No.: US 8,327,615 B2
(45) Date of Patent: Dec. 11, 2012

(54) COMBINED CYCLE POWERED GENERATING PLANT HAVING REDUCED START-UP TIME

(75) Inventor: Yoshinori Kitaguchi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 880 days.

(21) Appl. No.: 12/289,162

(22) Filed: Oct. 21, 2008

(65) Prior Publication Data

US 2009/0126338 A1    May 21, 2009

(51) Int. Cl.
*F01K 13/02* (2006.01)
(52) U.S. Cl. .................... 60/39.182; 60/39.3; 60/806
(58) Field of Classification Search .............. 60/39.3, 60/39.55, 39.182, 786–787, 806; 122/7 R, 122/7 B
See application file for complete search history.

(56) References Cited

U.S. PATENT DOCUMENTS

| | | | | |
|---|---|---|---|---|
| 5,471,832 A * | 12/1995 | Sugita et al. | ......... | 60/39.182 |
| 5,979,156 A * | 11/1999 | Uematsu et al. | ......... | 60/39.182 |
| 6,105,362 A * | 8/2000 | Ohtomo et al. | ......... | 60/39.182 |
| 6,339,926 B1 * | 1/2002 | Ichiro et al. | ......... | 60/39.182 |
| 6,393,822 B2 * | 5/2002 | Nagashima | ......... | 60/39.182 |
| 6,412,285 B1 * | 7/2002 | Ranasinghe et al. | ......... | 60/39.182 |
| 6,519,927 B2 * | 2/2003 | Liebig et al. | ......... | 60/39.182 |
| 6,560,966 B1 * | 5/2003 | Fetescu et al. | ......... | 60/806 |
| 6,666,028 B2 * | 12/2003 | Taguchi et al. | ......... | 60/39.182 |
| 2001/0022075 A1 * | 9/2001 | Mandai et al. | ......... | 60/39.182 |

FOREIGN PATENT DOCUMENTS

| | | |
|---|---|---|
| CA | 2285280 A1 | 8/1999 |
| JP | 5-163960 A | 6/1993 |
| JP | 9-112215 A | 4/1997 |
| JP | 10-047082 A | 2/1998 |
| JP | 10-077806 A | 3/1998 |
| JP | 11-093693 A | 4/1999 |
| JP | 2000-248962 A | 9/2000 |

OTHER PUBLICATIONS

JP 2007-088748 Office Action dated Aug. 2, 2011.

* cited by examiner

*Primary Examiner* — Ehud Gartenberg
*Assistant Examiner* — Lorne Meade
(74) *Attorney, Agent, or Firm* — Westerman, Hattori, Daniels & Adrian, LLP

(57) ABSTRACT

A combined cycle power generating plant that can realize a reduction in the start-up time includes a gas turbine, a steam turbine, a steam supplying section that supplies steam to the gas turbine, a first steam pipe that directs steam from the steam supplying section to the gas turbine, a second steam pipe that directs steam from the gas turbine to the steam turbine, a first release section that carries out control such that the supply destination of steam that is directed to the first steam pipe is one of either the outside of the gas turbine or the outside of the first steam pipe, a second release section that carries out control such that the supply destination of steam that is directed to the second steam pipe is one of either the outside of the steam turbine or the outside of the second steam pipe, and a bypass pipe that directs at least a portion of the steam inside the first steam pipe to the second steam pipe between the gas turbine and the second steam pipe.

11 Claims, 10 Drawing Sheets

FIG. 7

COMBINED CYCLE POWERED GENERATING PLANT HAVING REDUCED START-UP TIME

BACKGROUND OF THE INVENTION

1. Field of the Invention

This application is based on Japanese Patent Application No. 2007-088748, the content of which is incorporated herein by reference.

The present invention relates to a combined cycle power generating plant.

2. Description of Related Art

In recent years, thermal power plants that use liquefied natural gas and the like as a fuel have come to be widely used. A combined cycle power generating plant that is provided with a gas turbine plant and a steam turbine plant is widely used as such a thermal power plant.

In the combined cycle power generating plant described above, first, a gas turbine drives a generator to generate power. Simultaneously, in a heat recovery steam generator, the heat (exhaust heat) that has been discharged from the gas turbine generates steam by evaporating condensed water that has been supplied from a condenser. Steam that is thereby generated is supplied to the steam turbine and the steam turbine is thereby driven. A generator is driven by the steam turbine to generate power. Note that combined cycle power generating plants include those that are constructed such that separate shafts are provided to the gas turbine and the steam turbine, and each drives a separate generator, and those that are constructed such that a gas turbine, a steam turbine, and a generator are linked by a single shaft, and the single generator is driven.

It is known that the thermal efficiency (power generation efficiency) of the power generating plant that is used in the gas turbine described above is improved by increasing the temperature of the combustion gas at the inlet of the gas turbine. However, when the temperature of the combustion gas at the inlet is high, there is a concern that damage and melting of the high-temperature section of the gas turbine (for example, the combustor, the gas turbine stator blades, and the gas turbine rotor blades and the like) may occur due to the heat of the combustion gas. Thus, technology has been proposed in which the high-temperature section of the gas turbine is cooled to prevent damage and melting due to heat (Japanese Patent No. 3068925 and Japanese Unexamined Patent Application, First Publication No. 2000-248962).

The above two publications disclose a technology in which steam is used as a cooling medium that cools the high-temperature section of the gas turbine.

In the case in which steam is used as the cooling medium, when the pipes and the like (the cooling steam system) that supply steam become cool, a portion of the steam is condensed, and a drainage of water drops and the like is generated. The water drops are directed along with the steam to the high-temperature section of the gas turbine, and there is a concern that the water drops will be brought into contact with the high-temperature section of the gas turbine. The high-temperature section of the gas turbine with which water drops have come into contact is locally cooled, and thus there is a concern that the durability thereof will be reduced due to thermal stress.

Here, examples of a state in which the cooling steam system has cooled include the time during which the gas turbine plant is being started up and the time during which the gas turbine plant is being stopped.

In order to solve the problems described above, a method is known in which a gas turbine plant is warmed by channeling steam for a predetermined time to a cooling steam system before the gas turbine plant is started up (this is referred to as "warming"), and the formation of water drops inside the steam system is thereby prevented.

However, in the method in which the steam system is warmed simply by channeling steam in sequence from the upstream side of the cooling steam system, there are problems in that the warming takes time, and thus the start-up of the gas turbine plant (i.e., combined cycle power generating plant) takes time.

BRIEF SUMMARY OF THE INVENTION

The present invention is directed to solving the problems described above, and has as an object to provide a combined cycle power generating plant that enables the realization of a reduction in the start-up time.

In order to attain the object described above, the present invention provides the following solution.

The combined cycle power generating plant of the present invention is characterized in providing a gas turbine power generating section that is provided with a gas turbine; a steam turbine power generating section that is provided with a steam turbine; a boiler that supplies steam to the gas turbine and the steam turbine; a steam supplying section that supplies steam to the gas turbine; a first steam pipe that directs the steam from the steam supplying section to the gas turbine; a second steam pipe that directs steam from the gas turbine to the stream turbine; a first release section that carries out control such that the supply destination of the steam that is directed to the first steam pipe is one of either the outside of the gas turbine or the outside of the first steam pipe; a second steam release section that carries out control such that the supply destination of the steam that is directed to the second steam pipe is one of either the outside of the steam turbine or the outside section of the second steam pipe; and a bypass pipe that directs at least a portion of the steam in the first steam pipe to the second steam pipe between the gas turbine and the second release section.

According to the present invention, because the bypass pipe is provided, at least a portion of the steam that warms the first steam pipe is directed to the second steam pipe, and the first steam pipe and the second steam pipe are thereby warmed simultaneously.

Specifically, the steam that has been supplied to the first steam pipe warms the first steam pipe and is then discharged to the outside through the first release section. Simultaneously, the steam that has been supplied to the first steam pipe is supplied to the second steam pipe through the bypass pipe. The steam that has been supplied to the second steam pipe warms the second steam pipe and is then discharged to the outside through the second release section. Thus, the first steam pipe and the second steam pipe are warmed simultaneously.

When the first and second steam pipes have been warmed, the gas turbine power generating section is started up, and at the same time, steam is directed from the first steam pipe to the gas turbine, and steam is directed from the second steam pipe to the steam turbine.

Note that the first release section may be provided at one location on the first steam pipe, or alternatively, it may be provided at a plurality of locations. The number of locations is not limited. This also applies to the second release section. In addition, preferably, at least one of the first release sections is disposed adjacent to the gas turbine.

By providing the boiler and the steam supplying section separately, it is possible to limit the steam supply capacity that is required by the steam supplying section to a low level simply because the steam supplying section supplying steam to the gas turbine of the combined cycle power generating plant during the start-up. Thus, the time from the start-up of the steam supplying section until steam is supplied is shortened.

Preferably, the invention described above is constructed such that the bypass pipe directs steam from the first steam pipe between the steam supplying section and the first release section.

According to this construction, because the high-temperature steam that has been supplied from the steam supplying section is directed from the first steam pipe through the bypass pipe to the second steam pipe, the first and second steam pipes are thereby warmed simultaneously, and thus the time for warming the first and the second steam pipes is shortened. Specifically, the steam that has been supplied from the steam supplying section is divided into two streams, and these streams are channeled in parallel into the first and second steam pipes, and thus the time for warming the first and second steam pipes is reduced.

Because steam is channeled in parallel to the first and second steam pipes, in comparison to a method in which steam is channeled in sequence serially to the first steam pipe and then to second steam pipe, the high-temperature steam can be directed to the second steam pipe from an early stage. Thus, the second steam pipe, which is positioned on the downstream side, can be warmed quickly, and the time for warming the first and second steam pipes is thereby shortened.

Alternatively, preferably, the present invention described above is constructed such that the steam that has been released to the outside of the first steam pipe by the first release section is directed to the second steam pipe by the bypass pipe.

According to this construction, the steam that has warmed the first steam pipe and has been released from the first release section is channeled to the second steam pipe from the bypass pipe to warm the second steam pipe, and thus, the time for warming the first and second steam pipes can be reduced. Specifically, the time for warming the first and second steam pipes is reduced in comparison to channeling the steam that has been supplied from the steam supplying section serially from the first steam pipe to the second steam pipe.

Because the steam is channeled serially to the first and second steam pipes, in comparison to a method in which the steam is channeled in parallel to the first and second steam pipes, the amount of steam that is required to warm the first and second pipes is reduced. When the amount of the steam that is supplied is reduced, it is possible to use a steam supplying section having a low steam supply capacity, and the time required for the start-up of the steam supplying section is shortened.

Preferably, the invention described above is constructed such that a separating section that separates the steam and condensed water is provided on the bypass pipe.

According to this construction, the channeling of condensed water into the second steam pipe is prevented by providing the separator section on the bypass pipe.

In addition, in the case in which a recovery system for condensed water is provided, the condensed water that has been separated is supplied to the steam supplying section to be reused as steam, and the amount of water that is used is thereby reduced.

Preferably, the invention described above is constructed such that a condenser, into which steam that has driven the steam turbine is channeled, is provided in the steam turbine power generating section, and a third release section is provided that carries out control such that the supply destination of the steam that has been directed to the second steam pipe is one of either the steam turbine or the condenser.

According to this construction, by directing the steam inside the second steam pipe to the condenser, in comparison to a method in which the steam is released to the outside of the second steam section, that is, for example, into the atmosphere, steam (water) is recovered by the condenser, and thus, it is possible to reduce the amount of water that is used.

Note that in the case in which a second release section and a third release section are provided, the steam inside the second steam pipe may be released into the atmosphere by the second release section and be directed to the condenser by the third release section.

Preferably, the invention described above is constructed so as to be provided with a first control section that controls the channeling of steam from the first steam pipe into the gas turbine; a second control section that controls the channeling of the steam out of the gas turbine to the second steam pipe, and a fluid supply section that introduces a fluid that cools the gas turbine into the first steam pipe between the first control section and the gas turbine.

According to this construction, because the gas turbine is isolated from the first steam pipe and the second steam pipe and the cooling fluid is supplied to the gas turbine, the warming of the first and second steam pipes and the start-up of the gas turbine power generating section can be carried out simultaneously.

Specifically, the first and second steam pipes, which are shut off from the gas turbine, are joined by the bypass pipe, and thus, the first and second steam pipes are warmed by the steam supplying section irrespective of the state of the gas turbine power generating section. At the same time, while shut off from the first and second steam pipes, the gas turbine is cooled by a cooling fluid that has been supplied from the fluid supply section. Thus, the gas turbine power generating section can be started up in the interval during which the first and second steam pipes are being warmed.

Preferably, the present invention described above is constructed such that the boiler is a heat recovery steam generator that generates steam by using the exhaust heat of the gas turbine power generating section.

According to the present invention, it is possible to use the exhaust heat of the gas turbine power generating section effectively.

Preferably, the invention described above is constructed such that the steam supplying section is another boiler or an auxiliary boiler.

According to this construction, because the stream supply section is another boiler or an auxiliary boiler, steam is supplied independently of the operational states of the gas turbine power generating section and the steam turbine power generating section. Thus, even during the start-up and the stopping of the combined cycle power generating plant, a sufficient temperature is provided and a sufficient amount of steam is supplied for warming the first and second steam pipes.

Note that the another boiler is one that is different from the boiler that supplies steam to the turbine and the steam turbine, and specifically, examples of the another boiler include an auxiliary boiler or a heat recovery steam generator.

Preferably, the invention described above is constructed such that the steam supplying section is another heat recovery steam generator that generates steam by using the exhaust heat of the other gas turbine generator section.

According to this construction, for example, the steam that has been generated by using the exhaust heat of another steadily operating gas turbine power generating section 9-1 is supplied to and warms the first and second steam pipes associated with the gas turbine power generating section. Specifically, by using the exhaust heat of another steadily operating gas turbine power generating section, the start-up time for the steam supplying section becomes unnecessary, and thus the start-up time for the gas turbine power generating section becomes short.

If the steam supplying section satisfies the required steam conditions, a house boiler and a boiler of another adjacent plant, for example, may be conventional boilers for thermal generators.

According to the combined cycle power generating plant of the present invention, because a bypass pipe is provided, at least a portion of the steam that warms the first steam pipe is directed to the second steam pipe, and the first steam pipe and the second steam pipe are warmed simultaneously. Thus, an effect is exhibited in which it is possible to realize a shortening of the start-up time.

BRIEF DESCRIPTION OF THE SEVERAL VIEWS OF THE DRAWINGS

FIG. 7 is a schematic diagram for explaining the channeling of steam in the combined cycle power generating plant in FIG. 6 during start-up.

DETAILED DESCRIPTION OF THE INVENTION

First Embodiment

Below, a combined cycle power generating plant according to a first embodiment of the present invention will be explained with reference to FIG. 1 to FIG. 5.

Figure 1:
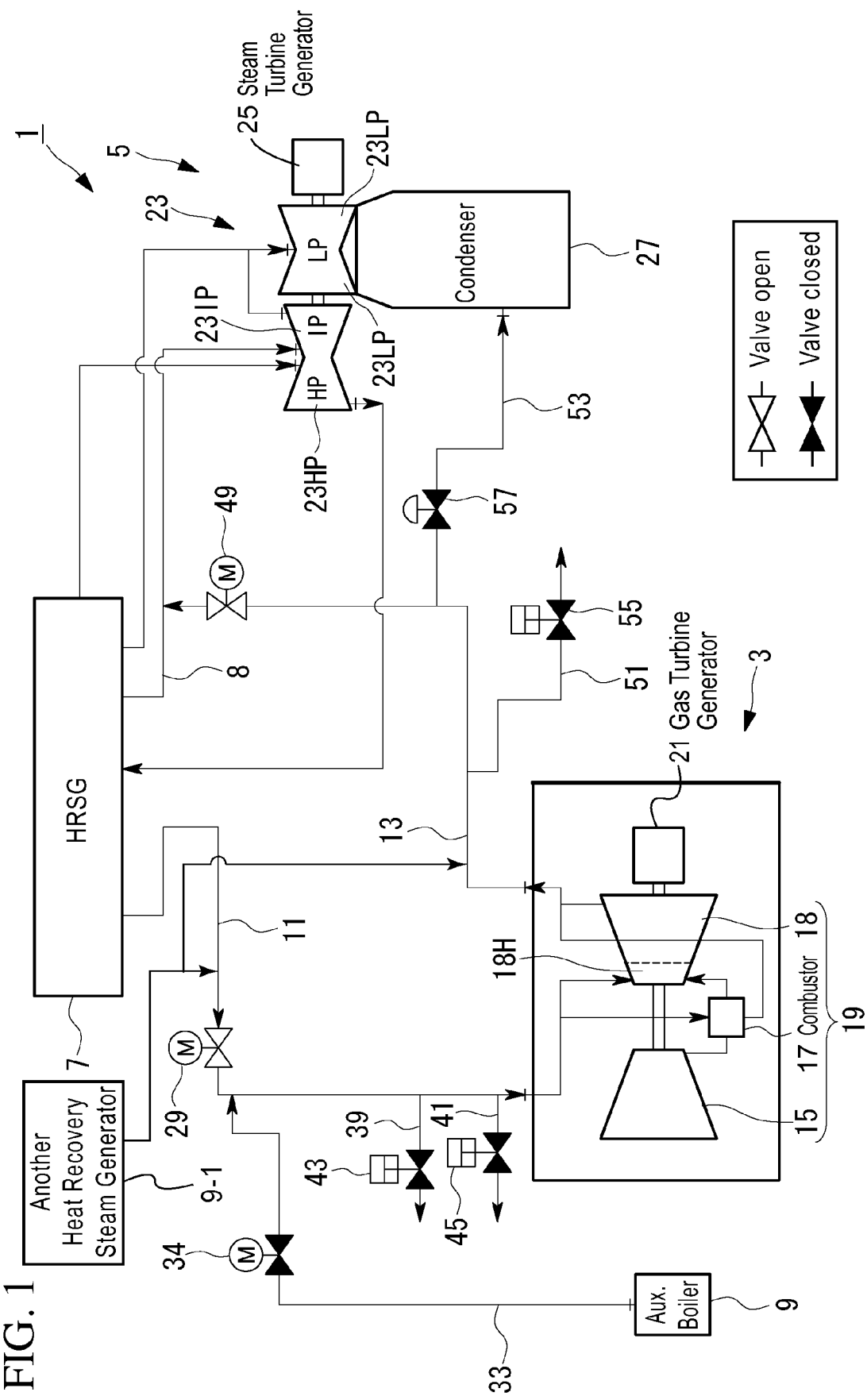
FIG. 1 is a schematic diagram for explaining the basic structure of the combined cycle power generating plant of a first embodiment of the present invention.

FIG. 1 is a schematic diagram for explaining the basic structure of the combined cycle power generating plant of the present embodiment.

As shown in FIG. 1, the combined cycle power generating plant 1 is provided with a gas turbine power generating section 3 that is provided with a gas turbine 19, a steam turbine power generating section 5 that is provided with a steam turbine 23, a heat recovery steam generator (boiler) 7 and an auxiliary boiler (steam supplying section) 9 that supply steam, and a first pipe 11 and a second pipe 13 that direct the steam.

The gas turbine power generating section 3 is one in which a gas turbine 19, which uses liquefied natural gas or the like as a fuel, is rotated, and the resulting rotational drive force is used to carry out power generation. As shown in FIG. 1, the gas turbine power generation section 3 is provided with a compressor 15, a combustor 17, a turbine 18, and a gas turbine generator 21.

The compressor 15 is rotatably driven by the turbine 18, draws in and compresses air, and supplies the compressed air to the combustor 17.

The combustor 17 mixes the compressed air that has been supplied from the compressor 15 with fuel, and a high-temperature, high-pressure combustion gas is generated by burning the mixed gas.

The turbine 18 uses the combustion gas that has been supplied from the combustor 17 to rotatably drive the compressor 15 and the gas turbine generator 21. Flow passages (not illustrated) through which the cooling steam is distributed, which will be described below, are formed in the gas turbine high-temperature sections such as the combustor 17 and the turbine stator blades and the turbine rotor blades in proximity to the inflow section (the turbine high-temperature section 18H) for the combusted gas in the turbine 18.

Note that well-known structural elements can be used for the structural elements of the gas turbine 19 and the like that are used in the gas turbine power generating section 3, and the structural elements are not limited in particular.

The steam turbine power generating section 5 rotates the stream turbine 23 by using steam that has been supplied from the heat recovery steam generator 7 and the like, and the rotational drive force thereof is used to carry out power generation. The stream turbine power generating section 5 is provided with a steam turbine 23, a steam turbine generator 25, and a condenser 27.

The stream turbine 23 rotatably drives the steam turbine generator 25 by using the steam that has been supplied from the heat recovery steam generator 7 and the steam that has been supplied after passing through the gas turbine 19. The present embodiment will be explained when applied to a steam turbine 23 that is constructed by a high-pressure steam turbine 23HP, an intermediate-pressure steam turbine 23IP, and a low-pressure steam turbine 23LP.

The condenser 27 condenses the steam that has rotatably driven the steam turbine 23, and returns water. Specifically, steam that has been discharged from the low-pressure steam turbine 23LP is directed to the condenser 27.

Note that well-known structural elements can be used for the steam turbine 23 and the like that are used in the steam turbine power generating section 5, and these are not limited in particular.

The heat recovery steam generator (HRSG) 7 generates steam by using the heat (exhaust heat) that is included in the combustion gas (exhaust gas) that has been discharged from the gas turbine 19. The steam that has been generated is supplied to the steam turbine power generating section 5 to be used for rotatably driving the steam turbine 23, and supplied to the gas turbine 19 to be used for the cooling of the combustor 17 and the turbine high-temperature section 18H and the like.

The auxiliary boiler 9 supplies steam to the combustor 17 and the turbine high-temperature section 18H and the like when steam cannot be supplied from the heat recovery steam generator 7, that is, when the gas turbine generating section 3 is being started up or is stopped. Because such an auxiliary boiler 9 is provided, it is possible to supply steam independently of the operating state of the gas turbine power generating section 3 and the steam turbine power generating section 5. Thus, even while the combined cycle power generating plant 1 is being started up or is stopped, a sufficient temperature can be provided and a sufficient amount of steam can be supplied to warm the first and second steam pipes 11 and 13, and it is possible thereby to shorten the start-up time of the combined cycle power generating plant 1.

Note that well-known structural elements can be used for the heat recovery steam generator 7 and the auxiliary boiler 9 and the like that are used in the generation of heat, and these are not limited in particular.

In addition, in FIG. 1, although a structure is shown in which the gas turbine 19 and the steam turbine 23 each drive separate generators 21 and 23, a structure may be used in which the gas turbine, the steam turbine, and the generator are linked by a single shaft to drive one generator, and the structure is not limited in particular (not illustrated).

Figure 2:
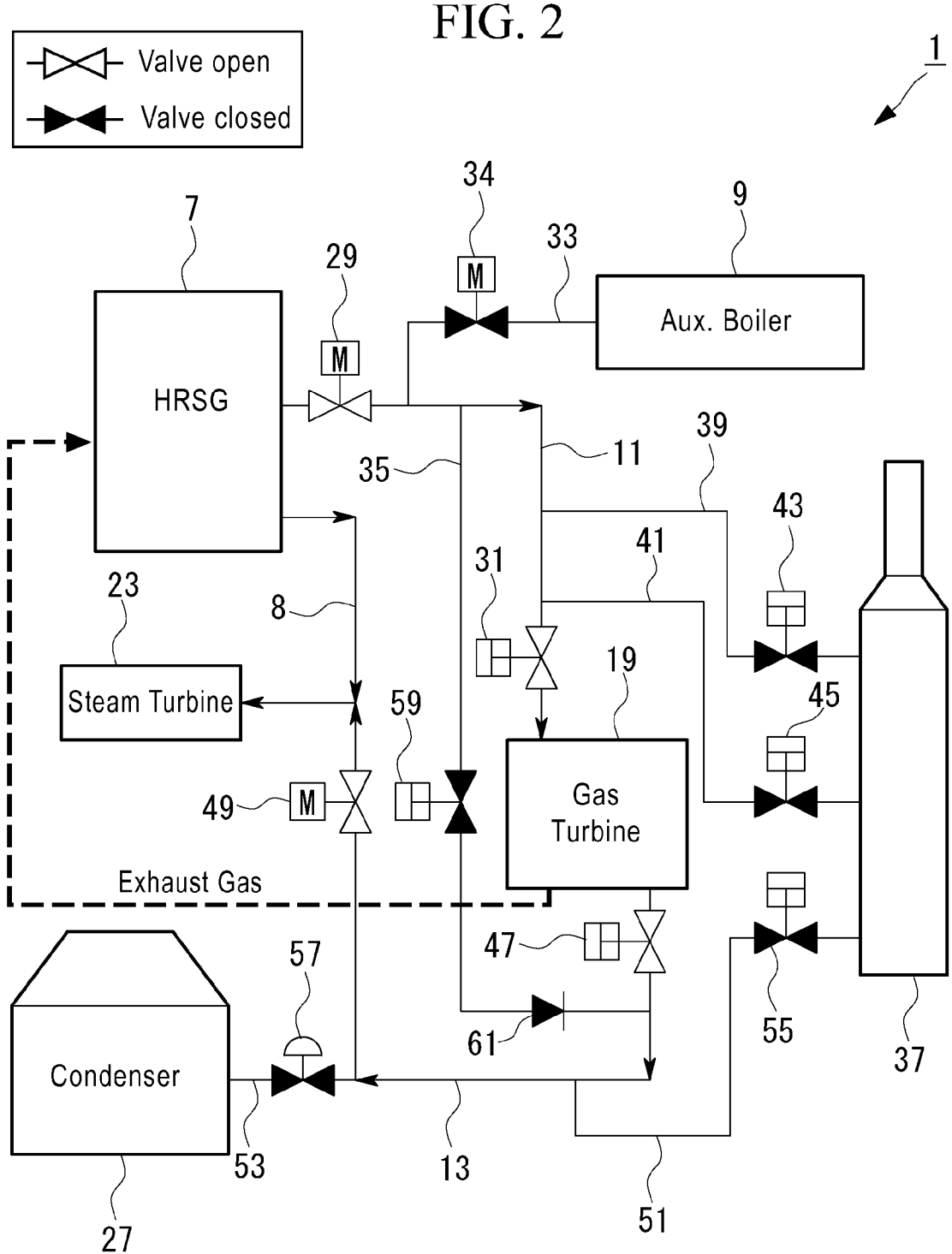
FIG. 2 is a schematic diagram for explaining the combined cycle power generating plant in FIG. 1.

FIG. 2 is a schematic diagram for explaining the combined cycle power generating plant in FIG. 1.

As shown in FIG. 2, the first steam pipe 11 is piping that supplies steam that has been generated by the heat recovery steam generator 7 and the auxiliary boiler 9 to the gas turbine 19 of the gas turbine power generating section 3. In sequence from the heat recovery steam generator 7, the first steam pipe 11 is provided with a first motor valve 29 and a first on-off valve 31. A first motor valve 29 is a valve in which opening control and closing control are carried out by a motor, and the first motor valve 29 connects and disconnects the heat recovery steam generator 7 and the first steam pipe 11. The first on-off valve 31 connects and disconnects the first steam pipe 11 and the gas turbine 19.

In sequence from the first motor valve 29 to the first on-off valve 31, an auxiliary steam pipe 33 that supplies steam from the auxiliary boiler 9, a bypass pipe 35 that directs steam to the second steam pipe 13, a first release pipe (first release section) 39 that directs steam to a flash pipe 37, and a second release pipe (first release section) 41 that directs steam to the flash pipe 37 are connected to the first steam pipe 11.

A first release valve (first release section) 43 that controls the release of steam is disposed on the first release pipe 39, and the second release valve (first release section) 45 that controls the release of steam is disposed on the second release pipe 41.

Preferably, the first and second release valves 43 and 45 are provided on the first and second release pipes 39 and 41 in proximity to the first steam pipe 11. However, this layout position is not limited in particular. Well-known valves such as on-off valves that control gas flow can be used as the first and second release valves 43 and 45, and these valves are not limited in particular.

As shown in FIG. 2, the second steam pipe 13 is piping that supplies steam that has been discharged from the gas turbine 19 of the gas turbine steam power generating section 3 to the steam turbine 23 of the steam turbine power generating section 5. In sequence from the gas turbine 19 side, a second on-off valve 47 and a second motor valve (third release section) 49 are provided on the second steam pipe 13.

The second on-off valve 47 connects and disconnects the second steam pipe 13 and the gas turbine 19. The second motor valve 49 is a valve for which opening control and closing control are carried out by a motor, and the second motor valve 49 connects and disconnects the second stream pipe 13 and the steam turbine 23.

In sequence from the second on-off valve 47 to the second motor valve 49, the bypass pipe 35, the third release pipe (second release section) 51 that directs steam to the flash pipe 37, and a fourth release pipe (third release section) 53 that directs steam to the condenser 27 are connected to the second steam pipe 13. The second steam pipe 13, through which steam is supplied from the second motor valve 49 to the steam turbine 23, is connected to the steam supply pipe 8, through which steam is supplied from the heat recovery steam generator 7 to the steam turbine 23

Because the steam inside the second steam pipe 13 is directed to the condenser 27 via a fourth release pipe 53, in comparison to the method in which steam is discharged to the atmosphere, the amount of water that is used is reduced because the steam (water) is captured by the condenser 27.

A third release valve (second release section) 55 that controls the release of steam is disposed on a third release pipe 51, and a fourth release valve (third release section) 57 that controls the release of steam is disposed on a fourth release pipe 53

Preferably, the third and fourth release valves 55 and 57 are provided on the third and fourth release pipes 51 and 53 in proximity to the second steam pipe 13. However, these layout positions are not limited in particular. Well-known valves such as on-off valves that control gas flow can be used as the third and fourth release valves 55 and 57, and these valves are not limited in particular.

The bypass pipe 35 is piping that communicates the first steam pipe 11 and the second steam pipe 13. A bypass valve 59 that controls the distribution of steam is disposed on the bypass pipe 35. The bypass valve 59 controls the channeling of steam in the bypass pipe 35 by opening and closing the bypass pipe 35.

The flash pipe 37 is a cylindrical member that releases steam that has been directed from the first release pipe 39, the second release pipe 41, and the third release pipe 51 to the atmosphere. A drainage section and the like, which discharge condensed water that has pooled inside the flash pipe 37 (not illustrated), are provided on the flash pipe 37.

Next, the power generating method during normal operation in the combined cycle power generating plant 1 having the structure described above will be explained.

As shown in FIG. 1, the combined cycle power generating plant 1 carries out power generation in the gas turbine power generating section 3 and the steam turbine power generating section 5.

The compressor 15 of the gas turbine power generating section 3 draws in and compresses air, and supplies the compressed air to the combustor 17. The compressed air is channeled into the combustor 17 and is mixed with fuel. The mixed gas is burned in the combustor 17, and high-temperature, high-pressure combustion gas is thereby generated. The combustion gas is channeled into and rotatably drives the turbine 18. The rotational drive force of the turbine 18 is transferred to the compressor 15 and the gas turbine generator 21. The compressor 15 compresses air as described above by being rotatably driven, and feeds the compressed air to the combustor 17. The gas turbine generator 21 is rotatably driven, and thereby generates power.

Combustion gas whose temperature has decreased after rotatably driving the turbine 18 is discharged from the gas turbine 19 as exhaust gas. This exhaust gas is channeled into the heat recovery steam generator 7, water is heated by the heat (exhaust heat) of the exhaust gas, and steam is thereby generated.

Most of the steam that has been generated is supplied to the steam turbine 23 of the steam turbine power generating section 5, and the steam turbine 23 is thereby rotatably driven. Specifically, steam is first supplied to the high-pressure steam turbine 23HP to drive the high-pressure steam turbine 23HP. Subsequently, the steam is supplied in sequence to the intermediate-pressure steam turbine 23IP and the low-pressure steam turbine 23LP, and the intermediate-pressure steam turbine 23IP and the low-pressure steam turbine 23LP are thereby rotatably driven.

In contrast, a portion of the steam that has been generated is supplied, for example, to the combustor 17 and the turbine high-temperature section 18H of the gas turbine 19 via the first steam pipe 11. The steam that has been supplied cools the combustor 17 and the gas turbine high-temperature section 18H and the like, and the steam is then discharged from the gas turbine 19. The steam that has been discharged is channeled into the steam turbine 23 of the steam turbine power generating section 5 via the second steam pipe 13, and the steam turbine 23 is thereby rotatably driven.

The rotational drive force of the steam turbine 23 is transferred to the steam turbine generator 25, and steam turbine generator 25 thereby carries out power generation. The steam that has been discharged from the steam turbine 23 is channeled into the condenser 27 to be condensed into water. The condensed water is fed to the heat recovery steam generator 7 and vaporized again. Then the process described above is repeated.

Preferably, a check valve 61 is provided on the bypass pipe 35 downstream of the bypass valve 59. The check valve 61 channels the steam from the first steam pipe 11 toward the second steam pipe 13, and alternatively, prevents the steam from being channeled from the second steam pipe 13 toward the first steam pipe 11.

Next, the operation during start-up, which is a feature of the combined cycle power generating plant 1 of the present embodiment, will be explained.

When the combined cycle power generating plant 1 of the present embodiment is started up, first, the gas turbine power generating section 3 is started up, and subsequently the steam turbine power generating section 5 is started up.

When the gas turbine power generating section 3 is to be started up, the warming of the first and second steam pipes 11 and 13 is carried out before the start-up of the gas turbine power generating section 3.

Figure 3:
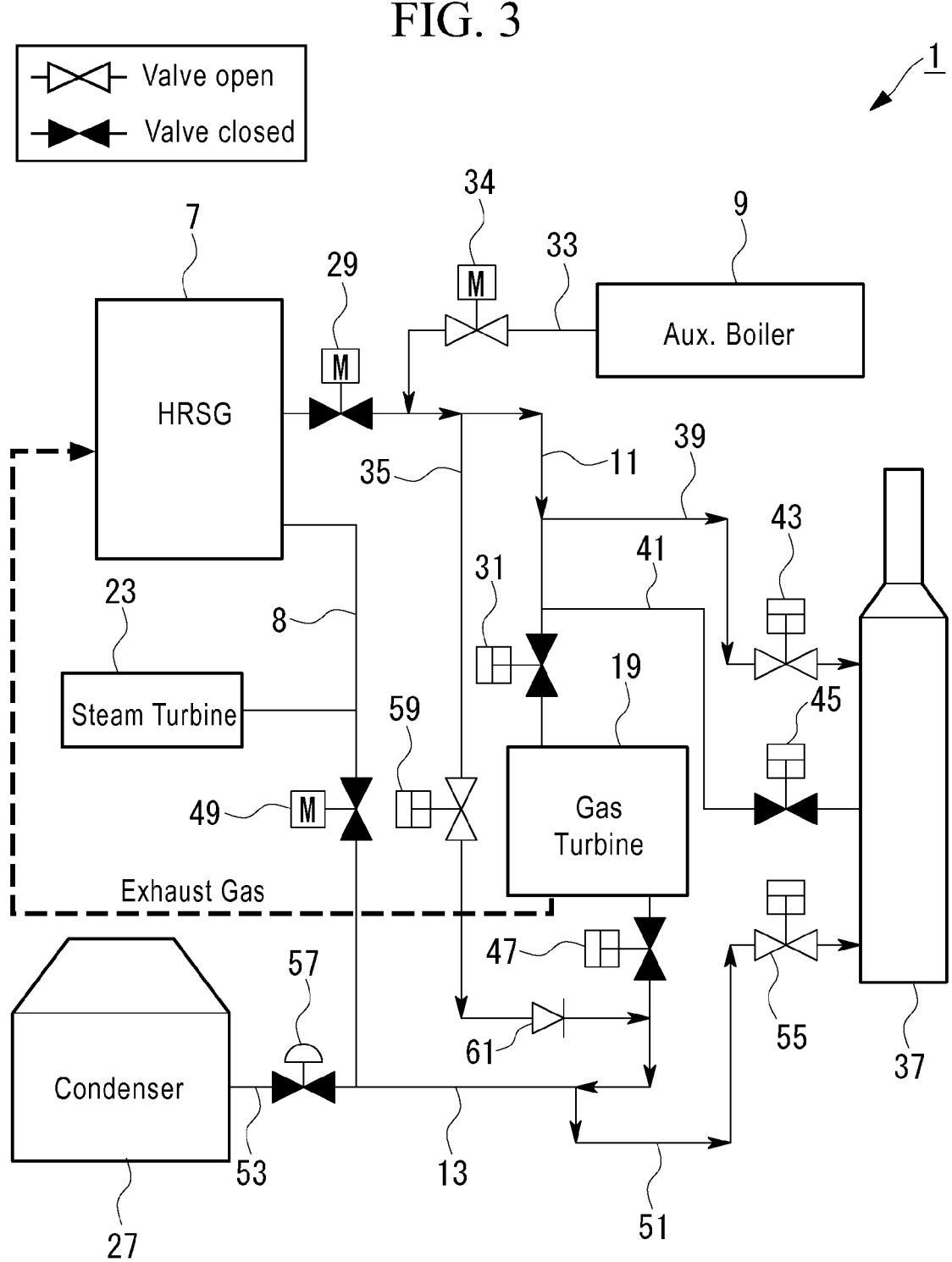
FIG. 3 is a schematic diagram for explaining the channeling of steam in the combined cycle power generating plant in FIG. 2 during start-up.

FIG. 3 is a schematic diagram for explaining the channeling of the steam during start-up in the combined cycle power generating plant of FIG. 2. In FIG. 3, the solid valves (black valves) indicate valves that are closed, and the open valves (white valves) indicate valves that are open.

First, the open and closed states of each of the valves during the initial period of the warming of the first and second steam pipes 11 and 13 will be explained. As shown in FIG. 3, the first motor valve 29, the first on-off valve 31, the second on-off valve 47, the second motor valve 49, the second release valve 45, and the fourth release valve 57 are closed.

In contrast, the first release valve 43, the third release valve 55, and the bypass valve 59 are open.

In this state, the auxiliary boiler 9 generates steam, and the steam that has been generated is supplied from the auxiliary steam pipe 33 to the first steam pipe 11. A portion of the steam that has been supplied is channeled through the first steam pipe 11 from the joint with the auxiliary steam pipe 33 to the joint with the first release pipe 39, and warms the first steam pipe 11 from the first motor valve 29 to the joint with the first release pipe 39. The steam that has warmed the first steam pipe 11 is channeled into the flash pipe 37 via the first release pipe 39 and is released to the atmosphere.

In contrast, the remainder of the steam that has been supplied is channeled into the second steam pipe 13 via the bypass pipe 35. The remaining steam is channeled through the second steam pipe 13 from the joint with the bypass pipe 35 to the joint with the third release pipe 51, and warms the second steam pipe 13 from the second on-off valve 47 to the joint with the third release pipe 51. The steam that has warmed the second steam pipe 13 is channeled into the flash pipe 37 via the third release pipe 51 and is released to the atmosphere.

Figure 4:
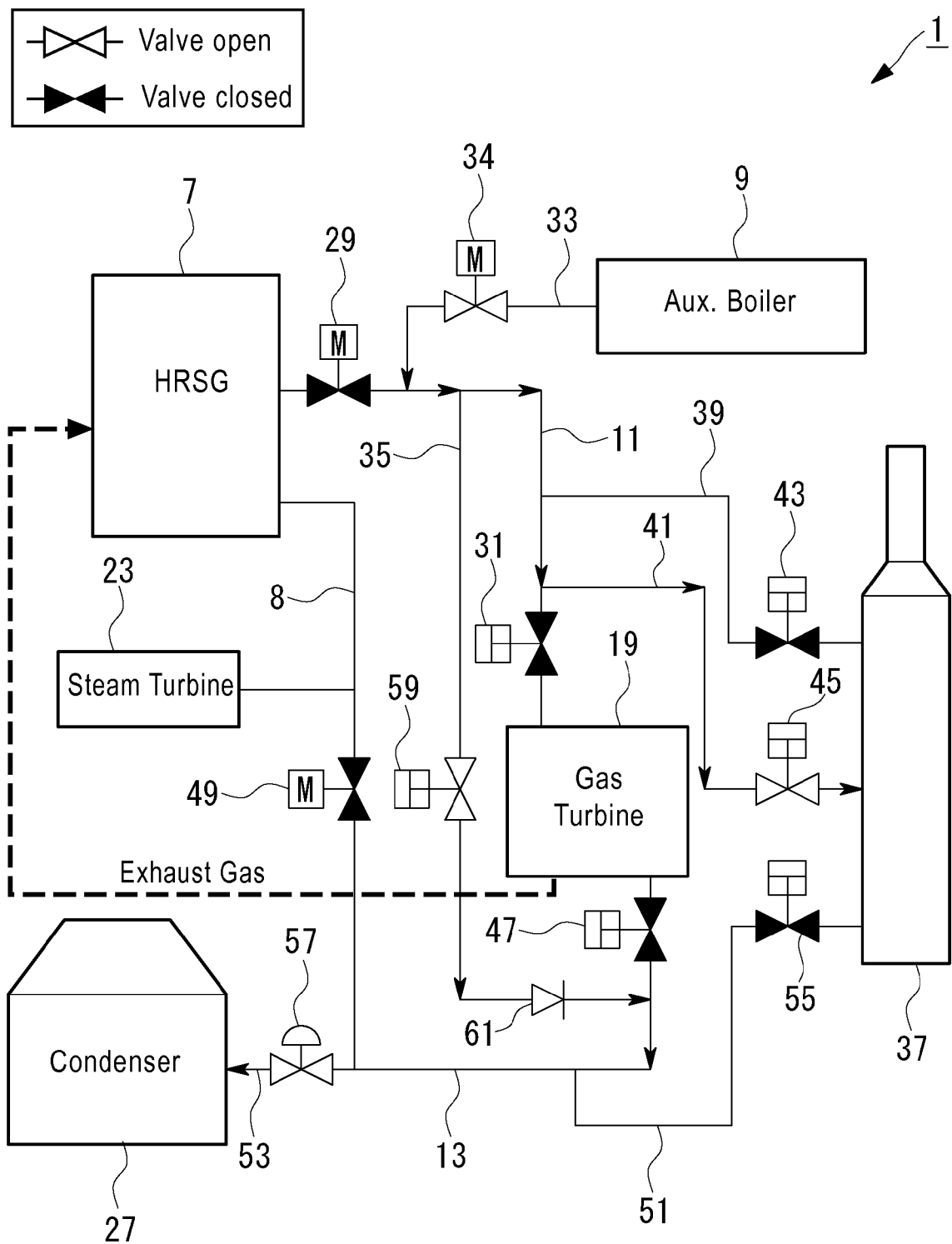
FIG. 4 is a schematic diagram for explaining the channeling of steam in the combined cycle power generating plant in FIG. 2 during start-up.

FIG. 4 is a schematic diagram for explaining the channeling of the steam in the combined cycle power generating plant in FIG. 2 during start-up.

Following the process described above, as shown in FIG. 4, the first release valve 43 and the third release valve 55 are closed, and the second release valve 45 and the fourth release valve 57 are opened.

Thus, the steam channeled through the first steam pipe 11 is channeled up to the joint with the second release pipe 41, and warms the first steam pipe 11 from the joint with the first release pipe 39 to the first on-off valve 31. The steam that has warmed the first steam pipe 11 is channeled into the flash pipe 37 via the second release pipe 41, and is released to the outside.

In contrast, the steam channeled through the second steam pipe 13 is channeled to the joint with the fourth release pipe 53, and warms the second steam pipe 13 from the joint with the third release pipe 51 to the joint with the fourth release pipe 53. The steam that has warmed the second steam pipe 13 is channeled into the condenser 27 via the fourth release pipe 53.

In this manner, when the warming of the first and second steam pipes 13 has been completed, the second release valve 45 is closed. At the same time, the first on-off valve 31 and the second on-off valve 47 are opened, the steam in the auxiliary boiler 9 is supplied to the combustor 17 and the gas turbine high-temperature section 18H, and the combustor 17 and the turbine high-temperature section 18H are warmed.

After the warming of the combustor 17 and the turbine high-temperature section 18H has been completed, the gas turbine power generating section 3 is started up.

When steam is generated in the heat recovery steam generator 7 by using the exhaust heat from the gas turbine 19, the first motor valve 29 is opened and the steam is supplied to the gas turbine 19. Simultaneously, the generation of steam in the auxiliary boiler 9 is stopped, and the auxiliary steam valve 34 is closed.

Then, the steam in the heat recovery steam generator 7 is supplied to the steam turbine 23, and the steam turbine power generating section 5 is started up.

At the point in time in which the conditions inside the second steam pipe 13 become substantially the same as the conditions inside the steam pipe 8, the second motor valve 49 is opened.

According to the structure described above, because the bypass pipe 35 is provided, a portion of the steam that is supplied from the auxiliary boiler 9 and that warms the first steam pipe 11 is directed to the second steam pipe 13, and the first steam pipe 11 and the second steam pipe 13 are warmed simultaneously. Thus, the start-up time of the combined cycle power generating plant 1 is shortened.

Specifically, the steam that has been supplied to the first steam pipe 11 warms the first steam pipe 11, and is then released to the outside via the first and second release pipes 39 and 41. At the same time, a portion of the steam that has been supplied to the first steam pipe 11 is supplied to the second steam pipe 13 via the bypass pipe 35. The second steam pipe 13 is warmed by the steam that has been supplied thereto, and this steam is then released to the outside via the third and fourth release pipes 51 and 53. Thus, the time for warming the first steam pipe 11 and the second steam pipe 13 is shortened, and the start-up time for the combined cycle power generating plant 1 is thereby shortened.

In the combined cycle power generating plant 1 of the present embodiment, high-temperature steam that has been supplied from the auxiliary boiler 9 is directed from the first steam pipe 11 to the second steam pipe 13 via the bypass pipe 35, and thus the first steam pipe 11 and the second steam pipe 13 are warmed simultaneously. Thus, the time for warming the first and second steam pipes 11 and 13 is shortened, and the start-up time for the combined cycle power generating plant 1 can be shortened.

Specifically, because the steam that has been supplied from the auxiliary boiler 9 is divided into two streams and the two streams are channeled in parallel to the first and second steam pipes 11 and 13, the time for warming the first and second steam pipes 11 and 13 is shortened. Because the steam is channeled in parallel to the first and second steam pipes 11 and 13, in comparison to a method in which the steam is channeled serially to the first and second steam pipes 11 and 13, high-temperature steam can be directed to the second steam pipe 13 at an early stage. Thus, the second steam pipe that is positioned downstream is warmed quickly, and the time for warming the first and second steam pipes 11 and 13 is thereby shortened.

In the combined cycle power generating plant 1 of the present embodiment, by providing the heat recovery steam generator 7 and the auxiliary boiler 9 separately, it is possible to limit to a low level the steam supply capacity that is required from the auxiliary boiler 9 simply because the auxiliary boiler 9 supplying steam to the gas turbine 19 of the combined cycle power generating plant 1 during start-up. Thus, the time from the start-up of the auxiliary boiler 9 until steam is supplied is shortened, and it is thereby possible to shorten the start-up time of the combined cycle power generating plant 1.

Figure 5:
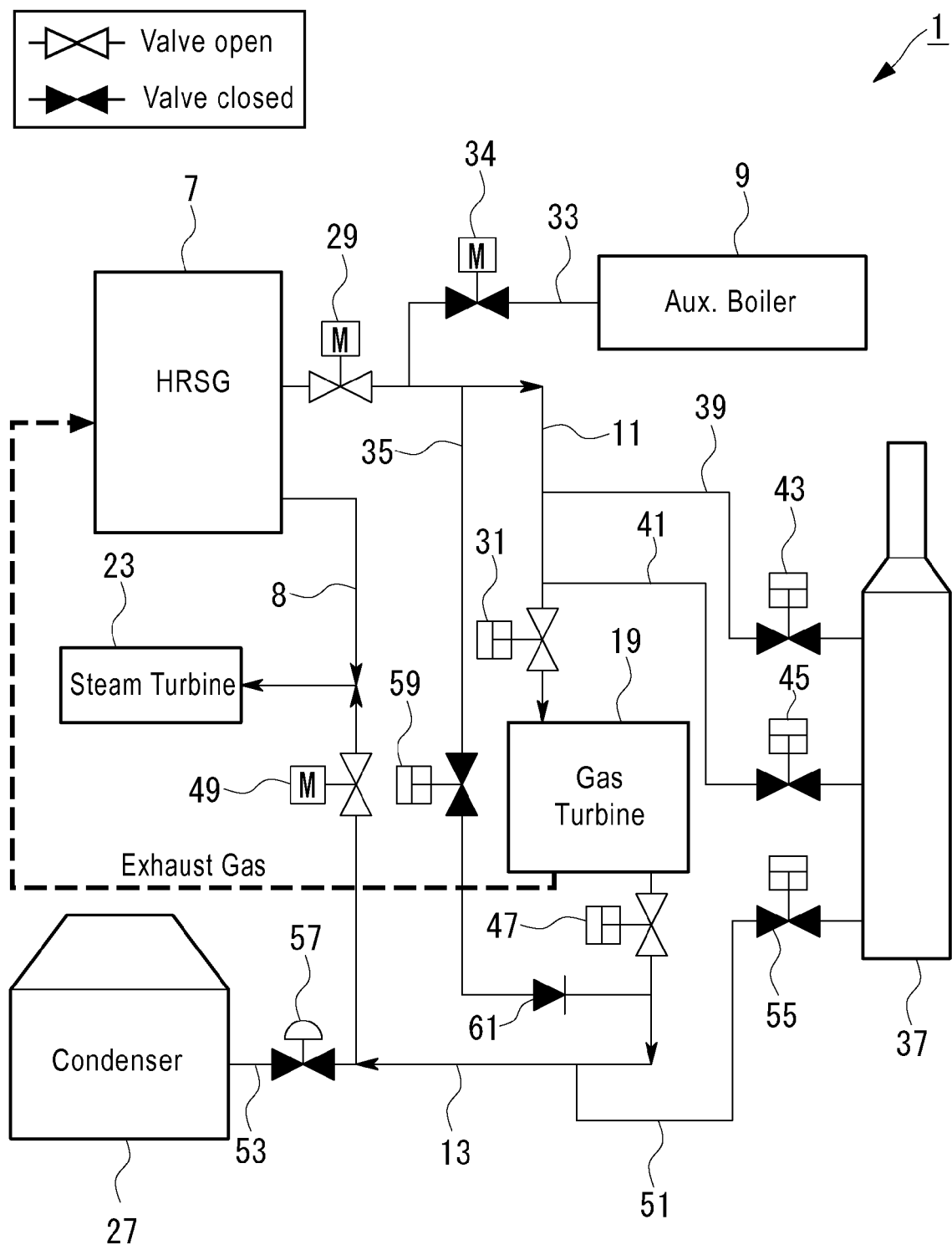
FIG. 5 is a schematic diagram for explaining an alternative embodiment of the combined cycle power generating plant in FIG. 2.

FIG. 5 is a schematic diagram for explaining an alternative embodiment of the combined cycle power generating plant in FIG. 2.

Note that, similarly to the embodiment described above, a first on-off valve 31 that connects and disconnects the first steam pipe 11 and the gas turbine 19, and a second on-off valve 47 that connects and disconnects the second steam pipe 13 and the gas turbine 19 may be provided. As shown in FIG. 5, the first on-off valve 31 and the second on-off valve 47 need not be provided, and this is not limited in particular.

Note that, similarly to the embodiment described above, the first steam pipe 11 may be divided into two areas and warmed by providing a first release pipe 39 and a second release pipe 41 on the first steam pipe 11, or may be divided into a larger number of areas and warmed all at once, or the entire first steam pipe 11 may be warmed, and this is not limited in particular. In conjunction with this, the number of release pipes that are provided on the first steam pipe 11 is not limited in particular.

In addition, this also applies to the second steam pipe 13.

Moreover, in the case in which plural gas turbine power generating sections 3 are provided, the first and second steam pipes 11 and 13 may be warmed by using steam that has been generated by the auxiliary boiler 9, as in the embodiment described above. Alternatively, steam that has been generated by the heat recovery steam generator 7 by using the exhaust heat of one of the steadily operating gas turbine power generating sections 3 may be supplied to and warm the first and second steam pipes 11 and 13 of another gas turbine power generating section 3. This is not limited in particular.

Because the start-up time for the auxiliary boiler 9 is made unnecessary due to the use of the exhaust heat of one of the steadily operating gas turbine power generating sections 3, it is possible to shorten the start-up time for the other gas turbine power generating sections 3.

Second Embodiment

Next, a second embodiment of the present invention will be explained with reference to FIG. 6 to FIG. 8.

The basic structure of the combined cycle power generating plant of the present embodiment is similar to that of the first embodiment. However, the method of warming the first and second steam pipes differs from that of the first embodiment. Thus, in the present embodiment, only the structure related to the warming of the first and second steam pipes will be explained with reference to FIG. 6 to FIG. 8, and the explanations of the other structural elements and the like will be omitted.

Figure 6:
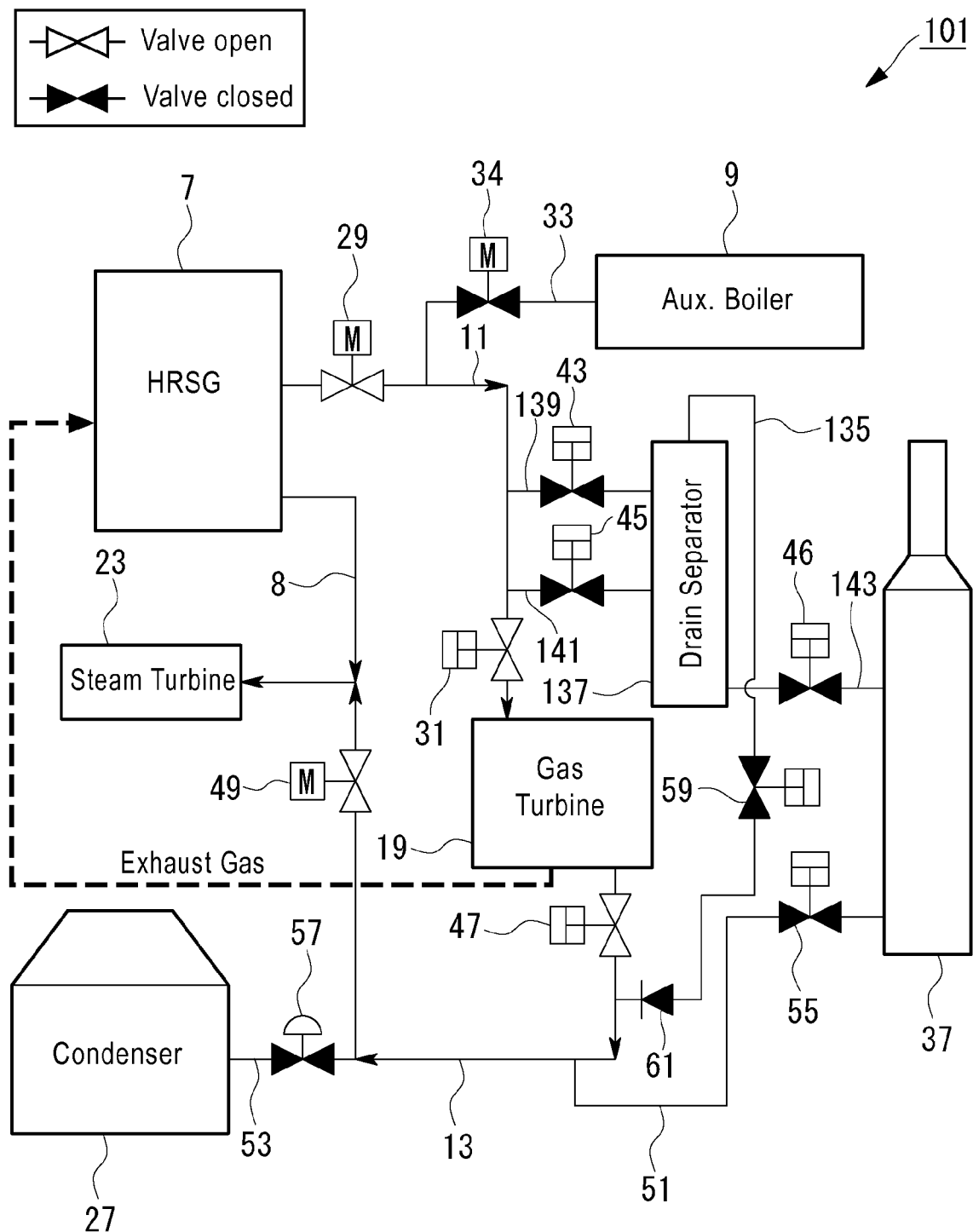
FIG. 6 is a schematic diagram for explaining the combined cycle power generating plant of a second embodiment the present invention.

FIG. 6 is a schematic diagram for explaining the combined cycle power generating plant of the present embodiment.

Note that the structural elements that are identical to those of the first embodiment have identical reference numerals appended thereto, and the explanations thereof will be omitted.

As shown in FIG. 6, the combined cycle power generating plant 101 is provided with the gas turbine 19, the steam turbine 23, the heat recovery steam generator 7 and the auxiliary boiler 9 that supply steam, and the first steam pipe 11 and the second steam pipe 13 that direct steam.

In sequence from the first motor valve 29 to the first on-off valve 31, the auxiliary steam pipe 33 that supplies steam from the auxiliary boiler 9, a first release pipe (first release section) 139 that directs steam to a drain separator 137, and a second release pipe (second release section) 141 that directs steam to a drain separator 137 are connected to the first steam pipe 11.

The first release valve 43 that controls the release of steam is disposed on a first release pipe 139, and the second release valve 45 that controls the release of steam is disposed on a second release pipe 141.

The drain separator (separating section) 137 separates the condensed water (mist and drainage), which in included in the inflowing steam, from the steam. A bypass pipe 135, which directs steam to the second steam pipe 13, and a fifth release pipe 143, which directs condensed water to the flash pipe 37, are connected to the drain separator 137. By providing the drain separator 137 on the bypass pipe 135, the inflow of condensed water into the second steam pipe is prevented, and the inflow of condensed water into the steam turbine 23 is prevented.

In addition, a recovery system (not illustrated) is provided that supplies the condensed water that has been separated to the auxiliary boiler 9 and the heat recovery steam generator 7 to be used again as steam, and the amount of water that is used is thereby reduced.

The bypass valve 59 that controls the channeling of steam is provided on the bypass pipe 135, and the fifth release valve 46 that controls the release of steam is disposed on the fifth release pipe 143.

In sequence from the second on-off valve 47 to the second motor valve 49, a bypass pipe 135, a third release pipe 51 that directs steam to the flash pipe 37, and the fourth release pipe 53 that directs steam to the condenser 27 are connected to the second steam pipe 13.

Next, the operation during the start-up, which is a feature of the combined cycle power generating plant 101 having the structure described above, will be explained. Note that the power generating method in the combined cycle power generating plant 101 of the present embodiment during normal operation is identical to that of the first embodiment, and thus the explanation thereof will be omitted.

When the combined cycle power generating plant 101 of the present embodiment is started up, similarly to the first embodiment, the warming of the first and second steam pipes 11 and 13 is carried out before the start-up of the gas turbine power generating section 3. Subsequently, in sequence, the gas turbine power generating section 3 and the steam turbine power generating section 5 are started up.

Figure 7:
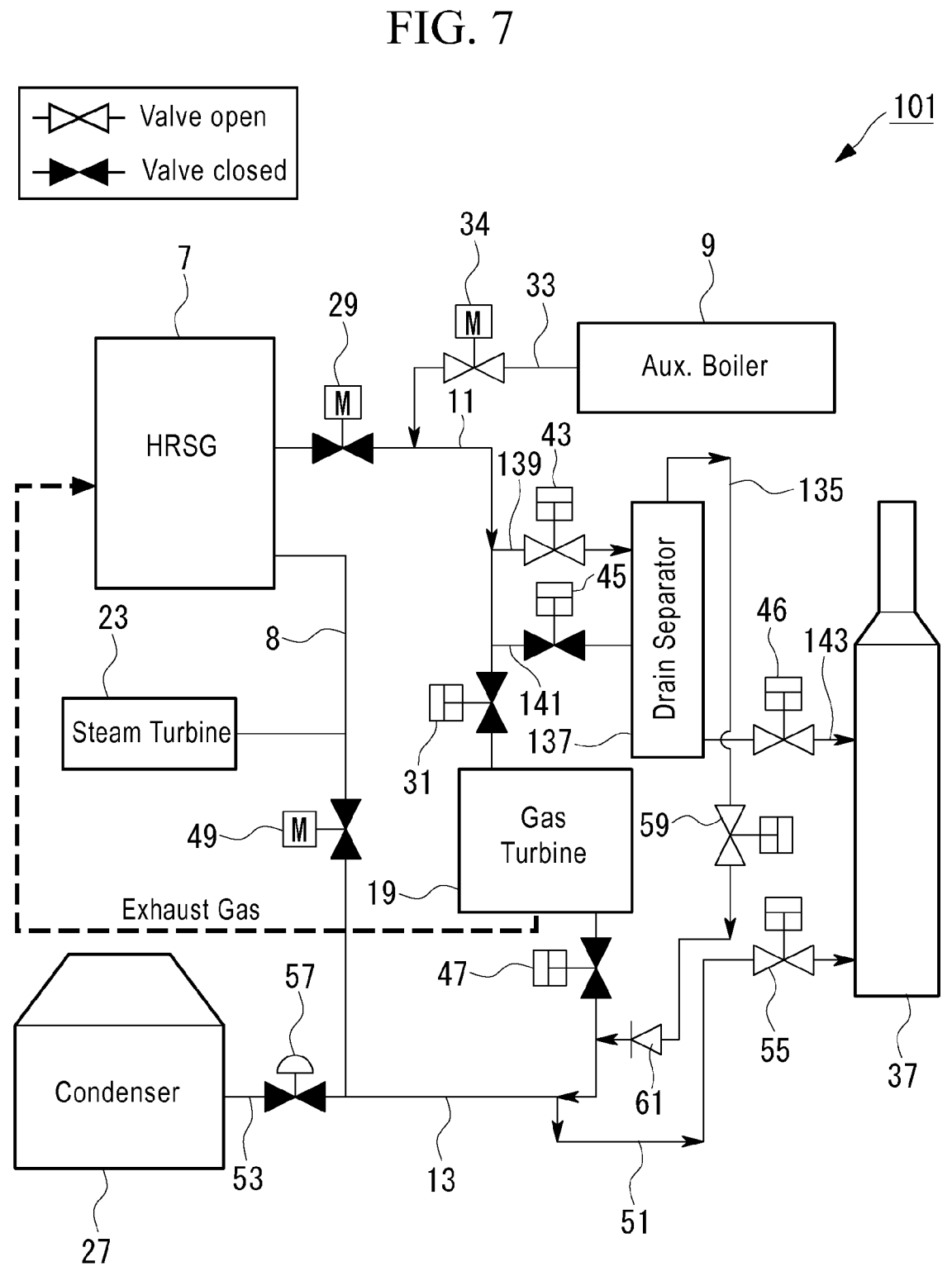

FIG. 7 is a schematic diagram for explaining the channeling of the steam in the combined cycle power generating plant of FIG. 6 during start-up. In FIG. 7, the solid valves (black valves) indicate closed valves and the open valves (white valves) indicate open valves.

First, the open and closed state of each of the valves during the initial period of the warming of the first and second steam pipes 11 and 13 will be explained. As shown in FIG. 7, the first motor valve 29, the first on-off valve 31, the second on-off valve 47, the second motor valve 49, the second release valve 45, and the fourth release valve 57 are closed.

In contrast, the first release valve 43, the third release valve 55, the bypass valve 59, and the fifth release valve 46 are open.

In this state, the auxiliary boiler 9 generates steam, and the steam that has been generated is supplied from the auxiliary steam pipe 33 to the first steam pipe 11. The steam that has been supplied is channeled through the first steam pipe 11 from the joint with the auxiliary steam pipe 33 to the joint with the first release pipe 139, and the first steam pipe is thereby warmed from the first motor valve 29 to the joint with the first release pipe 139. The steam that has warmed the first steam pipe 11 is channeled into the drain separator 137 via the first release pipe 139, and condensed water is separated. The condensed water flows into the flash pipe 37 from the drain separator 137 via the fifth release pipe 143 and is released to the outside.

The remaining steam is channeled into the second steam pipe 13 from the drain separator 137 via the bypass pipe 135. The remaining steam is channeled through the second steam pipe 13 from the joint with the bypass pipe 135 to the joint with the third release pipe 51 to warm the second steam pipe 13 from the second on-off valve 47 to the joint with the third release pipe 51. The steam that has warmed the second steam pipe 13 is channeled into the flash pipe 37 via the third release pipe 51, and is released to the outside.

Figure 8:
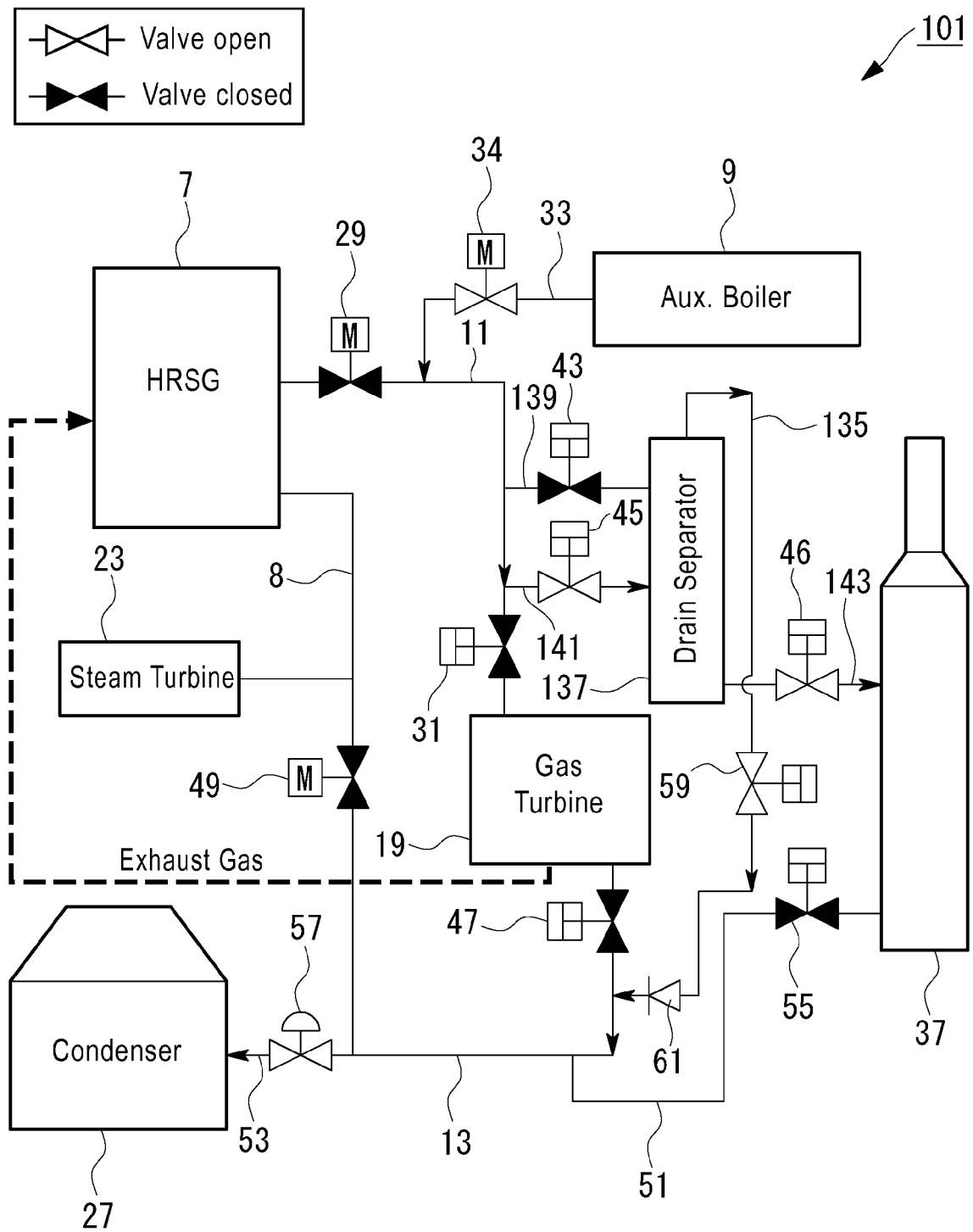
FIG. 8 is a schematic diagram for explaining the channeling of steam in the combined cycle power generating plant in FIG. 6 during start-up.

FIG. 8 is a schematic diagram for explaining the channeling of steam in the combined cycle power generating plant in FIG. 6 during start-up.

Subsequently, as shown in FIG. 8, the first release valve 43 and the third release valve 55 are closed, and the second release valve 45 and the fourth release valve 57 are opened.

Thus, the steam that has been channeled through the first steam pipe 11 is then channeled up to the joint with the second release pipe 141, and the first steam pipe 11 is warmed from the joint with the first release pipe 139 to the first on-off valve 31. The steam that has warmed the first steam pipe 11 is channeled into the drain separator 137 via the second release pipe 141, and the condensed water is separated. The condensed water flows into the flash pipe 37 from the drain separator 137 via the fifth release pipe 143, and is released to the outside.

The steam is channeled into the second steam pipe 13 from the drain separator 137 via the bypass pipe 135. The steam is channeled through the second steam pipe 13 from the joint with the bypass pipe 135 to the joint with the fourth release pipe 53, and warms the second steam pipe 13 from the second on-off valve 47 to the joint with the fourth release pipe 53. The steam that has warmed the second steam pipe 13 is channeled into the condenser 27 via the fourth release pipe 53.

In this manner, when the warming of the first and second steam pipe 11 and 13 has completed, the gas turbine power generating section 3 is started up.

The operation thereafter is identical to that of the first embodiment, and the explanation thereof will be omitted.

According to the structure described above, the steam that has warmed the first steam pipe 11 and has been released from either the first release pipe 139 or the second release pipe 141 is channeled from the bypass pipe 135 into the second steam pipe 13 to warm the second steam pipe, and thus the time for warming the first and second steam pipes 11 and 13 is reduced, and it is thereby possible to reduce the start-up time of the combined cycle power generating plant 101.

Specifically, the steam that has been supplied from the auxiliary boiler 9 is channeled serially from the first steam pipe 11 to the second steam pipe 13, and the time for warming the first and second steam pipes 11 and 13 is thereby reduced. Because the steam is channeled serially to the first and second steam pipes 11 and 13, in comparison to a method in which steam is channeled in parallel to the first and second steam pipes 11 and 13, the amount of steam that is necessary to warm the first and second steam pipes 11 and 13 is reduced. When the amount of steam that is supplied is reduced, it is possible to use an auxiliary boiler 9 that has a low steam supply capacity, and the time that is required for the start-up of the auxiliary boiler 9 is shortened.

Third Embodiment

Next, a third embodiment of the present invention will be explained with reference to FIG. 9 and FIG. 10.

The basic structure of the combined cycle power generating plant of the present embodiment is similar to that of the first embodiment. However, the start-up method of the gas turbine power generating section is different from that of the first embodiment. Thus, in the present embodiment, only the structures related to the start-up of the gas turbine power generating section will be explained with reference to FIG. 9 and FIG. 10, and the explanations of the other structural elements and the like will be omitted.

Figure 9:
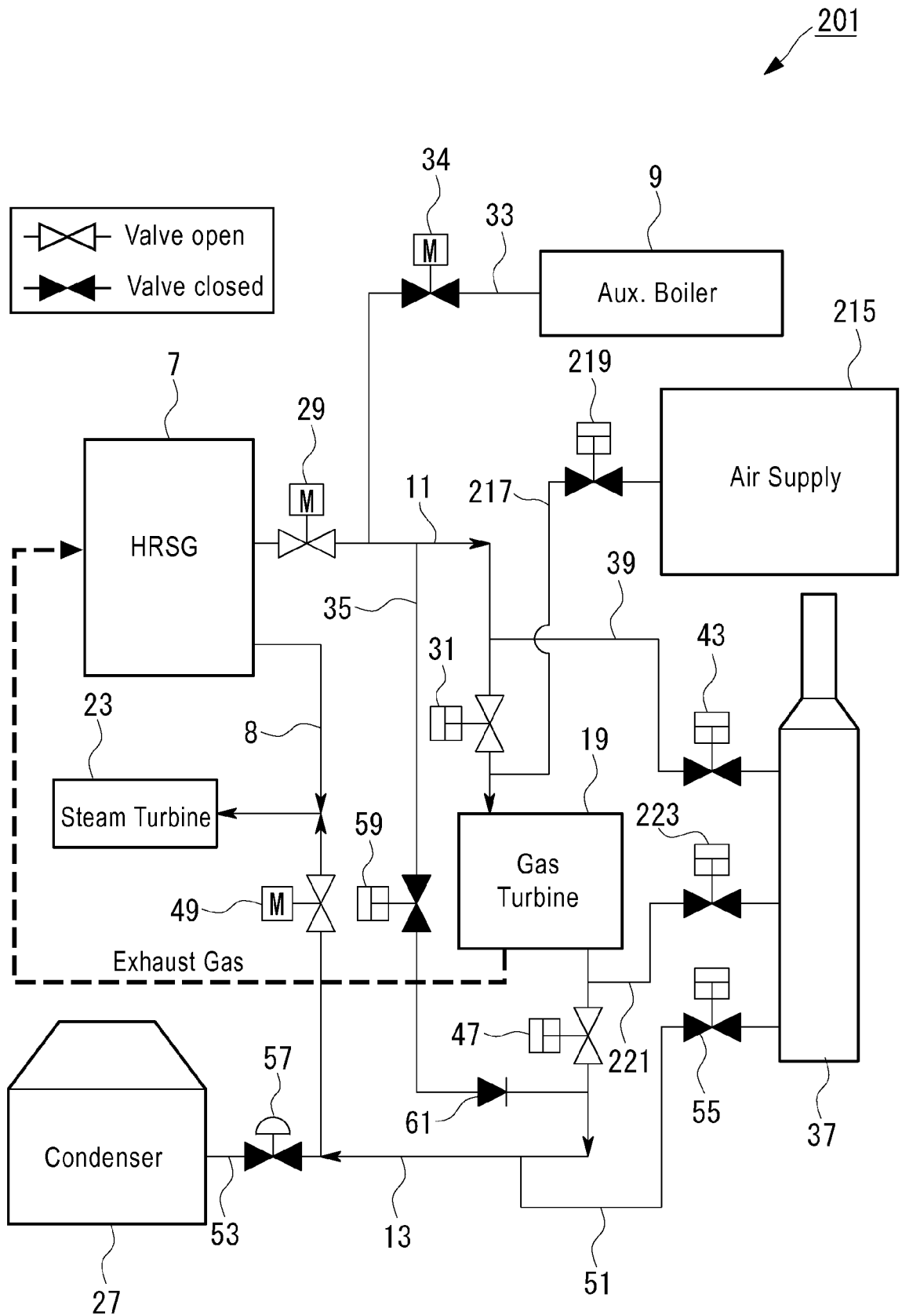
FIG. 9 is a schematic diagram for explaining the combined cycle power generating plant of a third embodiment of the present invention.

FIG. 9 is a schematic diagram for explaining the combined cycle power generating plant according to the present embodiment.

Note that the structural elements that are identical to those of the first embodiment have identical reference numerals appended thereto, and the explanations thereof will be omitted.

As shown in FIG. 9, a combined cycle power generating plant 201 is provided with the gas turbine 19, the steam turbine 23, the heat recovery steam generator 7 and the auxiliary boiler 9 that supply steam, the first steam pipe 11 and the second steam pipe 13 that direct steam, and an air supply section (fluid supply section) 215 that supplies coolant air to the gas turbine.

The air supply section 215 supplies air to the gas turbine 19 during the start-up of the gas turbine power generating section 3. An air supply pipe 217 that directs coolant air to the gas turbine 19 is provided in the air supply section 215. The air supply pipe 217 is connected to the first steam pipe 11 between the first on-off valve (first control section) 31 and the gas turbine 19. In addition, an air supply valve 219 that controls the channeling of the coolant air is provided on the air supply pipe 217.

A sixth release pipe 221 that directs coolant air and the like to the flash pipe 37 is connected to the second steam pipe 13 between the gas turbine 19 and the second on-off valve (second control section) 47. A sixth release valve 223 that controls the channeling of coolant air and the like is provided on the sixth release pipe 221.

Next, the operation of the combined cycle power generating plant 201 of the present embodiment during start-up will be explained. Note that during normal operation, the power generating method in the combined cycle power generating plant 201 having the structure described above is identical to that of the first embodiment, and thus the explanation thereof will be omitted. In addition, the method of warming the first and second steam pipes 11 and 13 is identical to that of the first embodiment, and thus the explanation thereof will be omitted.

When the combined cycle power generating plant 201 of the present embodiment is started up, the start-up of the gas turbine power generating section 3 and the warming of the first and second steam pipes 11 and 13 is carried out simultaneously, and subsequently, similarly to the first embodiment, the steam turbine power generating section 5 is started up.

Here, the start-up method for the gas turbine power generating section 3, which is a feature of the present embodiment, will be explained.

Figure 10:
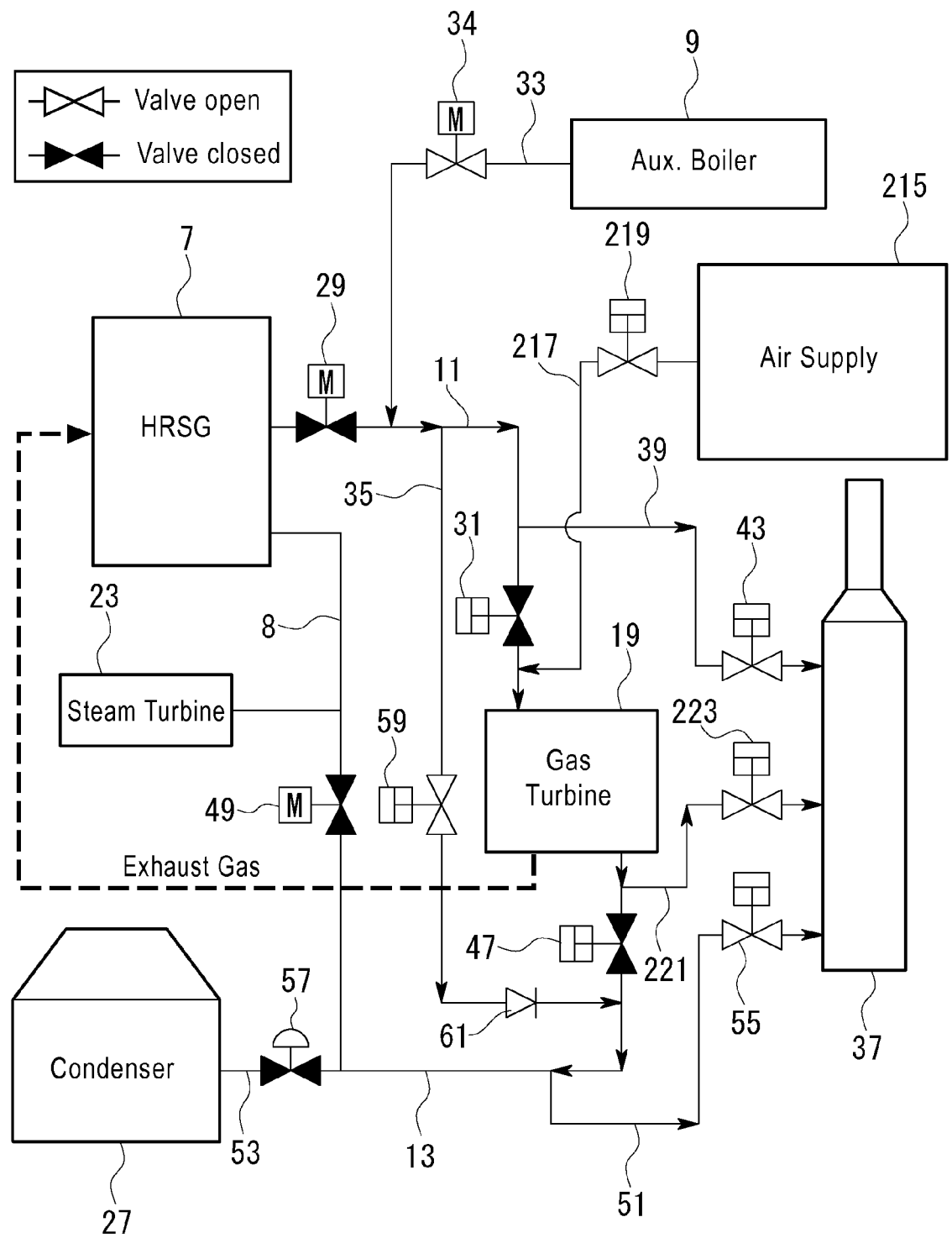
FIG. 10 is a schematic diagram for explaining the channeling of steam in the combined cycle power generating plant in FIG. 9 during start-up.

FIG. 10 is a schematic diagram for explaining the channeling of the steam in the combined cycle power generating plant in FIG. 9 during start-up. In FIG. 10, the solid valves (black valves) indicate closed valves, and the open valves (white valves) indicate open valves.

First, the air supply section 215 supplies coolant air to, for example, the combustor 17 and the turbine high-temperature section 18H of the gas turbine 19 via the air supply pipe 217. The coolant air that is channeled through the gas turbine 19, which has been shut off from the first and second steam pipes 11 and 13, is then channeled into the flash pipe 37 via the sixth release pipe 221 and released to the atmosphere.

In this state, the gas turbine power generating section 3 is started up.

Subsequently, when the warming of the first and second steam pipes 11 and 13 has been completed, the first on-off valve 31 and the second on-off valve 47 are opened, and steam is supplied to the gas turbine 19. Simultaneously, the air supply valve 219 is closed, and the supply of the coolant air is stopped.

Note that the start-up of the gas turbine power generating section 3 as described above may also be carried out simultaneously with the warming of the first and second steam pipes 11 and 13, may also be carried out before the warming of the first and second steam pipes 11 and 13, or may also be carried out after the start and before the completion of the warming of the first and second steam pipes 11 and 13, and is not limited in particular.

According to the structure described above, the gas turbine 19 is isolated from the first steam pipe 11 and the second steam pipe 13, and coolant air is supplied to the combustor 17 and the turbine high-temperature section 18H and the like, and thus the warming of the first and second steam pipes 11 and 13 and the start-up of the gas turbine power generating section 3 can be carried out simultaneously, and thus the start-up time of the combined cycle power generating plant 201 can be shortened.

Specifically, the first and second steam pipes 11 and 13, which have been shut off from the gas turbine 19, are joined by the bypass pipe 35, and thus the first and second steam pipes 11 and 13 are warmed by the auxiliary boiler 9 irrespective of the state of the gas turbine power generating section 3. In contrast, the gas turbine 19 is cooled by coolant air that has been supplied from the air supply section 215 while shut off from the first and second pipes 11 and 13. Thus, the gas turbine power generating section 3 also can be activated while the first and second stream pipes 11 and 13 are being warmed.

Note that, similarly to the embodiment described above, the air supply section 215 may be provided such that the coolant air is supplied separately from the cooling air for the gas turbine power generating section 3, or the compressed air that has been compressed by the compressor 15 of the gas turbine power generating section 3 may be used as coolant air, and this is not limited in particular.

What is claimed is:

1. A combined cycle power generating plant, comprising:
    a gas turbine power generating section that is provided with a gas turbine;
    a steam turbine power generating section that is provided with a steam turbine;
    a boiler that supplies steam to the gas turbine and the steam turbine;
    a steam supplying section that supplies steam to the gas turbine;
    a first steam pipe that directs steam from the steam supplying section to the gas turbine;
    a second steam pipe that directs steam from the gas turbine to the steam turbine;
    a first release section that carries out control such that the supply destination of the steam that is directed to the first steam pipe is to one of either the gas turbine or an outside of the combined cycle power generating plant;
    a second release section that carries out control such that the supply destination of the steam that is directed to the second steam pipe is to one of either the steam turbine or an outside of the combined cycle power generating plant; and
    a bypass pipe that directs at least a portion of the steam inside the first steam pipe to the second steam pipe between the gas turbine and the second release section,
    wherein the first release section carries out control such that the supply destination of the steam that is directed to the first steam pipe is to the outside of the combined cycle power generating plant when the combined cycle power generating plant starts up, and
    wherein the second release section carries out control such that the supply destination of the steam that is directed from the first steam pipe to the second steam pipe via the bypass pipe is to the outside of the combined cycle power generating plant when the combined cycle power generating plant starts up.

2. The combined cycle power generating plant according to claim 1, wherein the bypass pipe directs steam from the first steam pipe between the steam supplying section and the first release section.

3. The combined cycle power generating plant according to claim 2, wherein a separating section that separates steam and condensed water is provided on the bypass pipe.

4. The combined cycle power generating plant according to claim 1, wherein the bypass pipe directs steam that has been released to the outside of the first steam pipe by the first release section to the second steam pipe.

5. The combined cycle power generating plant according to claim 4, wherein a separating section that separates steam and condensed water is provided on the bypass pipe.

6. The combined cycle power generating plant according to claim 1, further comprising:
 a condenser that is provided on the steam turbine power generating section and into which steam that has driven the steam turbine is channeled; and
 a third release section that carries out control such that the supply destination of steam that is directed to the second steam pipe is to one of either the steam turbine or the condenser.

7. The combined cycle power generating plant according to claim 1, further comprising:
 a first control section that controls the channeling of steam from the first steam pipe into the gas turbine;
 a second control section that controls the channeling of steam out of the gas turbine into the second steam pipe; and
 a fluid supply section that introduces a fluid that cools the gas turbine to the first steam pipe between the first control section and the gas turbine.

8. The combined cycle power generating plant according to claim 1, wherein the boiler is a heat recovery steam generator that generates steam by using the exhaust heat of the gas turbine power generating section.

9. The combined cycle power generating plant according to claim 1, wherein the steam supplying section is another boiler.

10. The combined cycle power generating plant according to claim 1, wherein the steam supplying section is an auxiliary boiler.

11. The combined cycle power generating plant according to claim 1, wherein the steam supplying section is another heat recovery steam generator that generates steam by using the exhaust heat of a separate gas turbine power generating section.

* * * * *